United States Patent

Matthews et al.

[11] Patent Number: 6,065,340
[45] Date of Patent: May 23, 2000

[54] VIBRATORY ROTATION SENSOR WITH NOVEL ELECTRODE PLACEMENTS

[75] Inventors: Anthony Matthews, Santa Barbara; Guy T. Varty, Woodland Hills; David D. Lynch, Santa Barbara, all of Calif.

[73] Assignee: Litton Systems Inc., Woodland Hills, Calif.

[21] Appl. No.: 09/123,959

[22] Filed: Jul. 29, 1998

[51] Int. Cl.[7] .............................. G01P 9/04; G01C 19/00
[52] U.S. Cl. ............................................... 73/504.13
[58] Field of Search ........................... 73/504.13, 504.04, 73/504.12, 504.14, 504.15, 1.37, 1.38, 1.75, 1.77, 1.78

[56] References Cited

U.S. PATENT DOCUMENTS

| | | | |
|---|---|---|---|
| 4,157,041 | 6/1979 | Loper, Jr. et al. | 73/504.13 |
| 4,951,508 | 8/1990 | Loper, Jr. et al. | 73/504.13 |
| 5,287,033 | 2/1994 | Morton | 73/504.13 |
| 5,587,529 | 12/1996 | Iguchi et al. | 73/504.13 |
| 5,801,310 | 9/1998 | Matthews et al. | 73/504.13 |

*Primary Examiner*—Hezron Williams
*Assistant Examiner*—Helen C. Kwok
*Attorney, Agent, or Firm*—Robert E. Malm

[57] ABSTRACT

The invention is an apparatus for sensing rotation comprising a housing, a resonator attached to the housing, a first set of electrodes consisting of one or more electrically-connected electrodes, and a second set of N electrodes. The resonator is a rotationally-symmetric, thin-walled object capable of vibrating in at least one of a plurality of standing-wave modes. The orientation of a standing wave with respect to a reference point on the resonator is specified by an orientation angle. The first set of electrodes are attached to either the resonator or the housing. The N electrodes of the second set are attached around the circumference of either (1) the housing if the first set of electrodes is attached to the resonator or (2) the resonator if the first set of electrodes is attached to the housing. The n'th electrode of the second set is attached at angular position $\theta_n$ with respect to the reference point on the resonator, opposing one or more of the second set of electrodes. The apparatus further comprises driving electronics which supplies driving signals to one or more of the second set of electrodes and sensing electronics which receives the first-set signal appearing on the first set of electrodes as a result of the capacitive coupling between the first- and second-set electrodes. The sensing electronics also supplies one or more signals to the driving electronics.

56 Claims, 3 Drawing Sheets

FIG. 3

VIBRATORY ROTATION SENSOR WITH NOVEL ELECTRODE PLACEMENTS

BACKGROUND OF THE INVENTION

This invention relates generally to vibratory rotation sensors and more specifically to the placement of the electrodes used for driving such rotation sensors.

Figure 1:
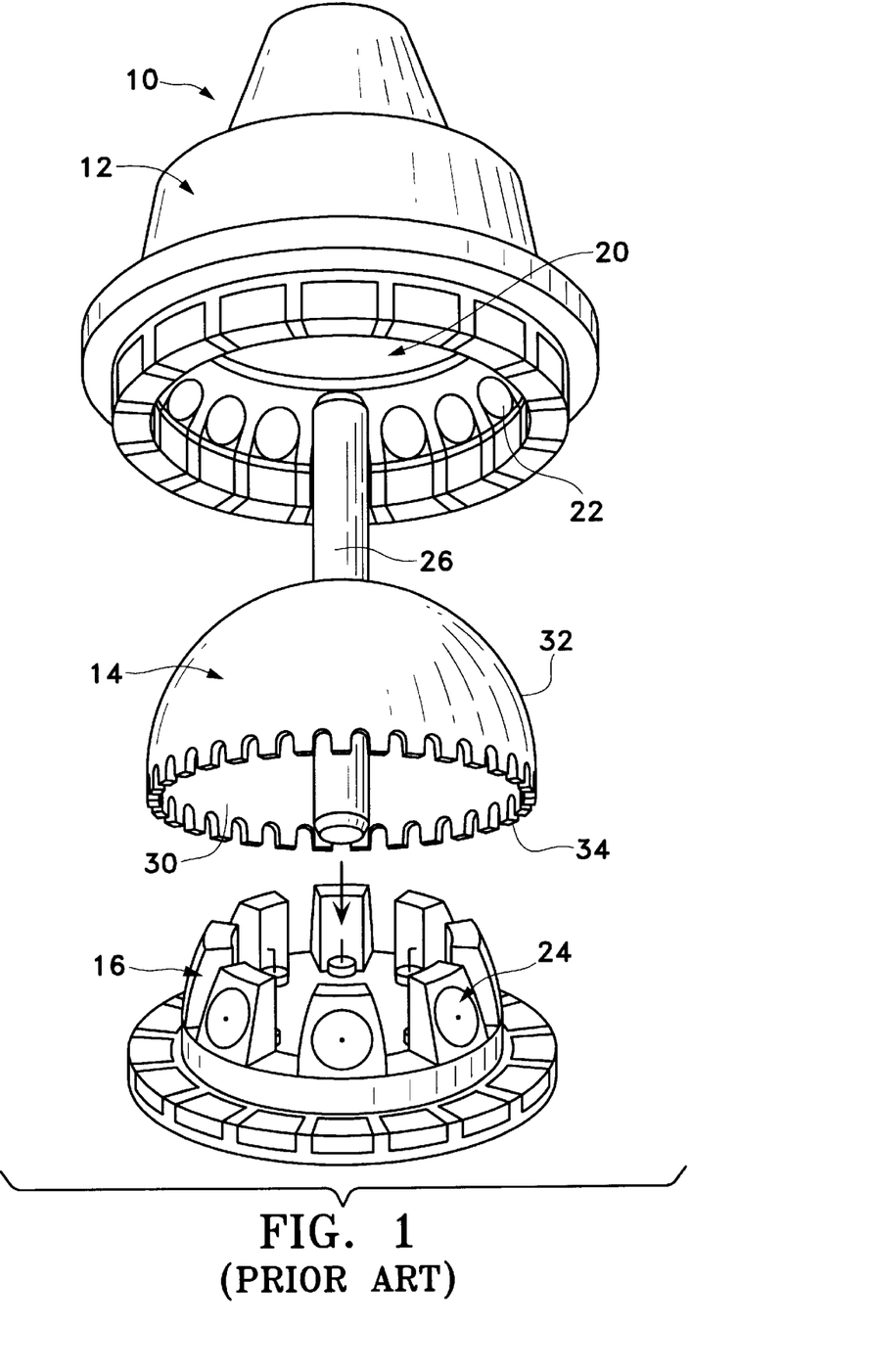
FIG. 1 shows the structure of a prior-art vibratory rotation sensor.

A prior-art vibratory rotation sensor (VRS) 10 consisting of an outer member 12, a hemispherical resonator 14, and an inner member 16, all made of fused quartz and joined together with indium, is shown unassembled in FIG. 1. The inertially-sensitive element is the thin-walled, 5.8-cm-diameter hemispherical resonator 14 positioned between the outer member 12 and the inner member 16 and supported by the stem 26.

A ring forcer electrode 20 and sixteen discrete forcer electrodes 22 are deposited on the interior surface of the outer member 12. In the assembled VRS 10, the ring forcer electrode 20 and the sixteen discrete forcer electrodes 22 are in close proximity to the exterior metalized surface 32 of the hemispherical resonator 14. In the assembled VRS, eight pickoff electrodes 24 deposited on the inner member 16 are in close proximity to the interior metalized surface 30 of the hemispherical resonator 14.

Capacitive forces can be exerted on the hemispherical resonator 14 by means of appropriate forcing voltage differences between the hemispherical resonator 14 and the ring forcer electrode 20 to cause the hemispherical resonator to vibrate in the lowest-order inextensional (or flexing) mode. A standing wave is established having four antinodes at 90-degree intervals about the circumference with four nodes offset by 45 degrees from the antinodes. The 0-degree and 180-degree antinodal points oscillate 90 degrees out of phase with 90-degree and the 270-degree antinodal points. The standing wave causes the shape of the rim of the hemispherical resonator to change from circular to elliptical (with semi-major axis through the 0-degree/180-degree antinodes) to circular to elliptical (with semi-major axis through the 90-degree/270-degree antinodes.

Rotation of the VRS 10 about an axis normal to the plane of the hemispherical-resonator rim 34 causes the standing wave to rotate in the opposite direction with respect to the VRS by an angle proportional to the angle of rotation of the VRS 10. Thus, by measuring the angle of rotation of the standing wave with respect to the VRS 10, one can determine the angle of rotation of the VRS 10.

The vibrational mode of the hemispherical resonator 14 is excited by placing a DC bias voltage on the hemispherical resonator 14 and an AC voltage on the ring forcer electrode 20, the frequency of the AC voltage being twice the resonant frequency of the hemispherical resonator 14.

The standing-wave pattern angle with respect to the VRS 10 is determined by measuring the currents that flow into and out of the pickoff electrodes 24 as the hemispherical resonator 14 vibrates and the capacitances of the pickoff electrodes 24 with respect to the hemispherical resonator vary. An x axis signal $I_x$ is obtained from the combination $I_0 - I_{90} + I_{180} - I_{270}$ where the subscripts identify the angular orientations relative to the x axis of the electrodes from which the currents originate. Similarly, a y axis signal $I_y$ is obtained from the combination $I_{45} - I_{135} + I_{225} - I_{315}$. The tangent of twice the standing-wave pattern angle with respect to the 0-degree (i.e. x) axis is given by the ratio of $I_y$ to $I_x$.

As a result of nonuniformities in the thickness of the hemispherical resonator 14, the establishment of a first standing wave will lead to the development of a second standing wave oscillating in phase quadrature with antinodes coinciding with the nodes of the first standing wave. The development of a second standing wave can be inhibited by placing appropriate voltages on the sixteen discrete forcer electrodes 22.

A DC bias voltage is typically maintained on the hemispherical resonator 14 in order to reduce the magnitudes of the AC forcing voltages applied to the ring forcer electrode 20 and the discrete forcer electrodes 22 and to make the force exerted on the resonator a linear function of the AC driving voltages. The presence of the DC bias voltage results in slow changes in the electrical properties of the VRS which have been attributed to capacitance changes caused by charge-migration phenomena taking place at or within the outer member 12 and the inner member 16. These slow changes have resulted in an unacceptably large performance degradation over time and special means have to be provided to compensate for these effects.

SUMMARY OF THE INVENTION

The invention is an apparatus for sensing rotation comprising a housing, a resonator attached to the housing, a first set of electrodes consisting of one or more electrically-connected electrodes, and a second set of N electrodes. The resonator is a rotationally-symmetric, thin-walled object capable of vibrating in at least one of a plurality of standing-wave modes. The orientation of a standing wave with respect to a reference point on the resonator is specified by an orientation angle.

The first set of electrodes are attached to either the resonator or the housing. The N electrodes of the second set are attached around the circumference of either (1) the housing if the first set of electrodes is attached to the resonator or (2) the resonator if the first set of electrodes is attached to the housing. The n'th electrode of the second set is attached at angular position $\theta_n$ with respect to the reference point on the resonator, opposing one or more of the second set of electrodes. The angular positions $\theta_n$, n taking on the values from 1 to N, are subject to a single constraining relationship.

The apparatus further comprises driving electronics which supplies driving signals to one or more of the second set of electrodes and sensing electronics which receives the first-set signal appearing on the first set of electrodes as a result of the capacitive coupling between the first- and second-set electrodes. The sensing electronics also supplies one or more signals to the driving electronics.

A driving voltage includes either a pair of excitation voltages or a forcing voltage or both. An excitation voltage has essentially no effect on the resonator dynamics but carries information pertaining to a tracking angle and the standing-wave parameters when it arrives at the first-set electrodes as a result of the capacitive coupling of the second set of electrodes to the first set. A forcing voltage causes forces to be applied to the resonator and thereby affects the dynamics of the resonator and the standing-wave parameters.

The excitation and forcing voltages can be structured in a variety of ways. A frequency-division multiplexing approach results in the excitation voltages being confined to separated frequency bands and the frequency spectrum of the forcing voltages being confined to a frequency band separated from the frequency bands associated with the excitation voltages.

A phase-division multiplexing approach results in the excitation voltages being periodic functions of time with the same frequency but with phases differing by a quarter of a cycle, the frequency spectrum of the forcing voltages being confined to a frequency band separated from the frequencies of the excitation voltages.

One time-division multiplexing approach results in the excitation voltages being proportional to unique square waves that take on the values 0 and 1, and each forcing voltage including a multiplicative factor proportional to a square wave that takes on the values 0 and 1 where only one of the square waves associated with the excitation and forcing voltages takes on the value 1 at any given time.

A second time-division multiplexing approach results in each excitation voltage being proportional to the product of a periodic function of time having a predetermined frequency and phase and a unique square wave that takes on the values 0 and 1 and each forcing voltage including a multiplicative factor proportional to a square wave that takes on the values 0 and 1, only one of the square waves associated with the excitation and forcing voltages taking on the value 1 at any given time.

A code-division multiplexing approach results in the excitation voltages being proportional to unique square waves which take on the values of −1 and 1 in accordance with predetermined pseudorandom sequences, the frequency spectrum of the forcing voltages being confined to a frequency band separated from the frequency band associated with the excitation voltages.

The process of determining the orientation angle of a standing-wave (and the rotation of the rotation-sensing apparatus) from the resonator signal consists of first extracting at least two components from the resonator signal and then determining the difference between the orientation angle and the tracking angle by performing operations on the two components. In the case of frequency-division multiplexing wherein the two components occupy separated frequency bands, each component is extracted by performing operations on the resonator signal that discriminate between the separated frequency bands.

In the case of phase-division multiplexing wherein the two components are periodic functions having the same frequency and phases that differ by one-quarter of a cycle, each component is extracted by performing operations on the resonator signal that discriminate between the phases of the two components.

In the case of time-division multiplexing wherein the two components are present in the resonator signal during different time periods, each component is extracted by performing operations on the resonator signal that discriminate between the different time periods.

In the case of code-division multiplexing wherein the two components are pseudorandom sequences of 0's and 1's and the cross correlation of the pseudorandom sequences is 0, each component is extracted by performing operations on the resonator signal that discriminate between the two pseudorandom sequences.

In one mode of operation, the tracking angle is continually adjusted so as to maintain the difference between the orientation angle and the tracking angle at zero on average. The orientation angle is calculated by adding the tracking angle to the difference between the orientation angle and the tracking angle.

Another mode of operation is to hold the tracking angle constant and measure the orientation angle directly.

Still another mode of operation is to hold the tracking angle constant and force the orientation angle to equal the tracking angle. The force applied to the resonator that causes the orientation angle to change is a measure of the rate of rotation of the resonator.

DESCRIPTION OF THE PREFERRED EMBODIMENTS

The invention is a vibratory rotation sensor for which the control and readout is accomplished with multiplexed signals which can accomodate a wide variety of novel electrode placements. The vibratory rotation sensor of the present invention consists of a resonator, a housing to which the resonator is attached, and multiplex electronics. The resonator can be any rotationally-symmetric thin-walled object having standing-wave vibration modes. The prior art typically suggests that the resonator be hemispherical in shape.

Figure 2:
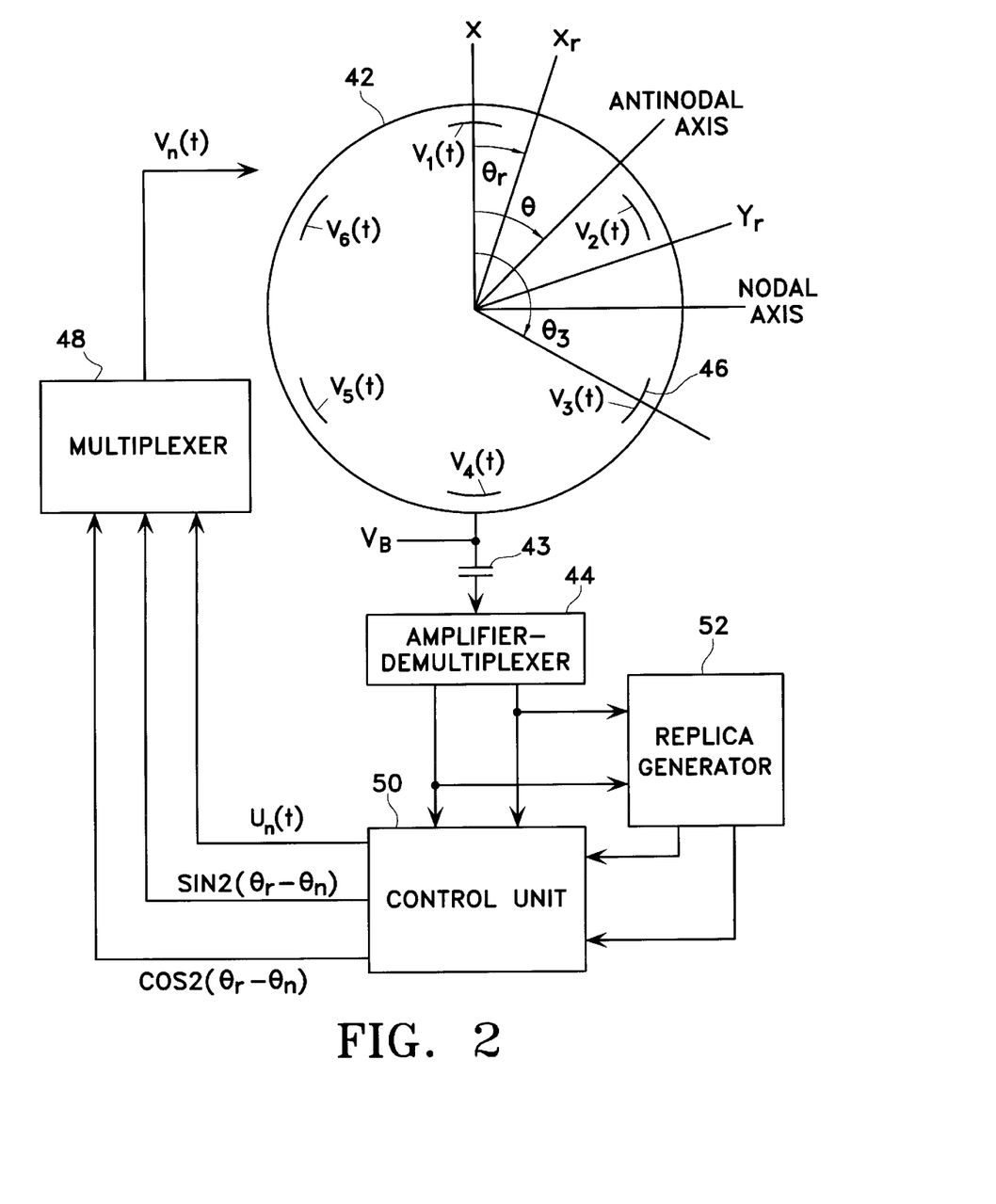
FIG. 2 shows a block diagram of the control and readout electronics for the invention.

A simplified method for determining the parameters of the standing waves and controlling the dynamics of the resonator is illustrated in FIG. 2. The standing waves are describable with respect to x and y axes fixed with respect to the resonator. The orientation of the inphase standing wave with respect to the resonator can be specified by the orientation angle $\theta$ of an inphase antinodal axis measured clockwise from the x axis. The deviation of the resonator rim from a circle along the inphase antinodal axis is assumed to vary as $\cos(\omega t+\phi)$ where $\omega$ is the vibration frequency, t is time, and $\phi$ is an arbitrary phase angle. The orientation of the quadrature standing wave with respect to the resonator is specified by the orientation angle $\theta+\pi/4$ of a quadrature antinodal axis measured clockwise from the x axis. The deviation of the resonator rim from a circle along the quadrature antinodal axis is assumed to vary as $\sin(\omega t+\phi)$.

The circumferentially-continuous resonator electrode 42, deposited on the interior surface of the resonator, is biased to a DC voltage or low-frequency AC voltage $V_B$ and is connected through a DC-blocking capacitor 43 to the amplifier-demultiplexer 44. A plurality N of electrodes 46 attached to the VRS housing are spaced about the circumference in close proximity to the resonator electrode 42. The angular position of the n'th electrode measured clockwise from the x-axis is denoted by $\theta_n$ where n takes on the values from 1 to N. The n'th electrode is supplied with the driving voltage $V_n(t)$ from the multiplexer 48 where $$V_n(t)=V_{mxr}(t)\cos(2\theta_r-2\theta_n)\cos(\omega_{xr}t+\psi_{xr})-V_{myr}(t)\sin(2\theta_r-2\theta_n)\cos(\omega_{yr}t+\psi_{yr})+V_{cn}(t)U_n(t) \quad (1)$$

The excitation voltages $V_{mxr}(t)\cos(\omega_{xr}t+\psi_{xr})$ and $V_{myr}(t)\cos(\omega_{yr}t+\psi_{yr})$ are components in the $x_r$–$y_r$ tracking-angle coordinate system of FIG. 2 (denoted by the r in the subscripts). The preferred embodiments of the excitation voltages include the sinusoids $\cos(\omega_{xr}t+\psi_{xr})$ and $\cos(\omega_{yr}t+\psi_{yr})$. There are a variety of periodic functions $F(\omega_{xr}t+\psi_{xr})$ which may be utilized instead of the sinusoids including ordinary square waves.

The $x_r$-axis is rotated clockwise from the x-axis by the tracking angle $\theta_r$. The excitation voltages are designed not to affect the parameters of a standing wave on the resonator. The angular frequencies $\omega_{xr}$ and $\omega_{yr}$ and phases $\psi_{xr}$ and $\psi_{yr}$ depend on the type of multiplexing being used. The forcing voltages $V_{cn}(t)U_n(t)$ cause forces to be applied to the resonator for the purpose of controlling the parameters of the one or more standing waves on the resonator. The functions $U_n(t)$ are generated by control unit 50 and supplied to multiplexer 48. The voltages $V_{cn}(t)$ are predetermined functions used to isolate the forcing voltages from the excitation voltages.

The current $I(t)$ flowing from the resonator electrode 42 into the amplifier-demultiplexer 44 is given by $$I(t) = \sum_{n=1}^{N} I_n(t) \quad (2)$$

where $$I_n(t) = K_I C_n [V_{mxr}(t)\omega_{xr}\cos(2\theta_r - 2\theta_n)\cos(\omega_{xr}t + \psi_{xr}) - \quad (3)$$
$$V_{myr}(t)\omega_{yr}\sin(2\theta_r - 2\theta_n)\cos(\omega_{yr}t + \psi_{yr}) + V_{cn}(t)\omega_{Un}U_n(t)]$$

The capacitances $C_n$ are the capacitances of the electrodes 46 with respect to the resonator electrode 42. The angular frequencies $\omega_{Un}$ are those associated with the corresponding U's and are typically equal to or less than $2\omega$ where $\omega$ is the resonator vibration frequency. The symbol $K_I$ denotes a constant. The phase differences between the driving voltages and the resulting currents are of no relevance and have been ignored in the equations above. The capacitances are given by $$C_n = C_o[1 + d_i\cos(2\theta - 2\theta_n)\cos(\omega t + \phi) - d_q\sin(2\theta - 2\theta_n)\sin(\omega t + \phi)] \quad (4)$$

where terms involving higher orders of $d_i$ and $d_q$ have been omitted. The effects of the higher-order terms are taken into account in subsequent processing operations. The quantity $C_o$ is the capacitance of the electrode pairs when the resonator is not excited, $d_i$ and $d_q$ are the maximum flexing amplitudes respectively of the inphase and quadrature modes divided by the gap between the resonator electrode 42 and the electrodes 46 when the resonator is not excited, $\theta$ is the angle between the antinode of the inphase standing wave and the x-axis, $\omega$ is the angular frequency of vibration of the resonator, and $\phi$ is an arbitrary phase angle.

Substituting the expressions for the capacitances in the current equation, we obtain $$I(t) = \frac{N}{2} K_I C_o V_{mxr}(t)\omega_{xr}\cos(\omega_{xr}t + \psi_{xr})d_i\cos(2\theta - 2\theta_r)\cos(\omega t + \phi) - \quad (5)$$
$$\frac{N}{2} K_I C_o V_{mxr}(t)\omega_{xr}\cos(\omega_{xr}t + \psi_{xr})d_q\sin(2\theta - 2\theta_r)\sin(\omega t + \phi) +$$
$$\frac{N}{2} K_I C_o V_{myr}(t)\omega_{yr}\cos(\omega_{yr}t + \psi_{yr})d_i\sin(2\theta - 2\theta_r)\cos(\omega_t + \phi) +$$
$$\frac{N}{2} K_I C_o V_{myr}(t)\omega_{yr}\cos(\omega_{yr}t + \psi_{yr})d_q\cos(2\theta - 2\theta_r)\sin(\omega t + \phi) +$$
$$K_I C_o \sum_{n=1}^{N} V_{mxr}(t)\omega_{xr}\cos(2\theta_r - 2\theta_n)\cos(\omega_{xr}t + \psi_{xr}) -$$
$$K_I C_o \sum_{n=1}^{N} V_{myr}(t)\omega_{yr}\sin(2\theta_r - 2\theta_n)\cos(\omega_{yr}t + \psi_{yr}) +$$
$$\sum_{n=1}^{N} K_I V_{cn}(t)\omega_{Un} U_n(t) C_n$$

where it is assumed that $$\sum_{n=1}^{N} \exp(j4\theta_n) = 0 \quad (6)$$

The expression above can be realized in a number of ways. For example, N electrodes could be spaced around the circumerence of the VRS at $2\pi/N$ radian intervals for all values of N except 1, 2, and 4. The N electrodes do not have to be uniformly spaced. For example, for N=5, a particular set of values which satisfies equation (6) are $\theta_1 = \pi/8$, $\theta_2 = \pi/6$, $\theta_3 = 5\pi/6$, $\theta_4 = 11\pi/8$, and $\theta_5 = 2\pi$.

The current $I(t)$ is transformed into the voltage $V(t)$ by the amplifier-demultiplexer 44:

$$V(t) = K_V[V_x(t)R_x(t) + V_y(t)R_y(t)] + K_F \sum_{n=1}^{N} V_{cn}(t)\omega_{Un} U_n(t) C_n + \quad (7)$$
$$K_F C_o \sum_{n=1}^{N} V_{mxr}(t)\omega_{xr}\cos(2\theta_r - 2\theta_n)\cos(\omega_{xr}t + \psi_{xr}) -$$
$$K_F C_o \sum_{n=1}^{N} V_{myr}(t)\omega_{yr}\sin(2\theta_r - 2\theta_n)\cos(\omega_{yr}t + \psi_{yr})$$

where $K_V$ and $K_F$ are constants and $$V_x(t) = V_{mxr}(t)\omega_{xr}\cos(\omega_{xr}t + \psi_{xr})$$
$$V_y(t) = V_{myr}(t)\omega_{yr}\cos(\omega_{yr}t + \psi_{yr})$$
$$R_x(t) = d_i\cos(2\theta - 2\theta_r)\cos(\omega t + \phi) - d_q\sin(2\theta - 2\theta_r)\sin(\omega t + \phi)$$
$$R_y(t) = d_i\sin(2\theta - 2\theta_r)\cos(\omega t + \phi) + d_q\cos(2\theta - 2\theta_r)\sin(\omega t + \phi) \quad (8)$$

The signals $R_x(t)$ and $R_y(t)$ are the desired outputs from a demultiplexing process applied to $V(t)$ since they contain the standing wave parameters $d_i$, $d_q$, $\theta - \theta_r$, $\omega$, and $\phi$.

Signals $S_x(t)$ and $S_y(t)$ containing the signals $R_x(t)$ and $R_y(t)$ are extracted by amplifier-demultiplexer 44. The operating principle of the demultiplexer portion of the amplifier-demultiplexer 44 depends on the form of the voltages $V_{mxr}(t)$, $V_{myr}(t)$, and $V_{cn}(t)$, and the values of $\omega_{xr}$, $\omega_{yr}$, $\psi_{xr}$, and $\psi_{yr}$.

For frequency-division multiplexing, $V_{mxr}(t)$, $V_{myr}(t)$, and $V_{cn}(t)$ are all equal to a constant, $\omega_{xr}$, $\omega_{yr}$, and $|\omega_{xr} - \omega_{yr}|$ are greater than about $6\omega$, and $\psi_{xr}$, and $\psi_{yr}$ are arbitrary constants. The signals $R_x(t)$ and $R_y(t)$ which contain the standing-wave parameters are obtained by performing two product demodulations of $V(t)$, one with respect to $\cos(\omega_{xr}t + \psi_{xr})$ and the other with respect to $\cos(\omega_{yr}t + \psi_{yr})$. If a periodic function other than a sinusoid is being used, then the demodulations proceed using replicas of the periodic functions. A product demodulation consists of multiplying the input voltage by the reference sinusoid (or replica) and lowpass filtering the product, the cutoff frequency of the lowpass filter being about $3\omega$. The results of the above process are the signals $S_{FDMx}(t)$ and $S_{FDMy}(t)$:

$$S_{FDMx}(t) = K_{FDM}R_x(t)$$
$$S_{FDMy}(t) = K_{FDM}R_y(t) \quad (9)$$

where $K_{FDM}$ is a constant. Because the upper limit to the frequency spectrums of $V_{cn}(t)\omega_{Un}U_n(t)C_n$ are about $3\omega$, these quantities are eliminated by the demultiplexing process. The second and third summations of equation (7) are transformed into (1) signals with frequency spectrums greater than about 3ω and are eliminated in the demultiplexing process and (2) DC terms which are eliminated in subsequent operations.

For phase-division multiplexing, $\omega_{xr}$ and $\omega_{yr}$ have the same value $\omega_o$, $\omega_o$ being greater than about 6ω, and $\psi_{xr}-\psi_{yr}$ is equal to π/2 radians. The signals $S_{PDMx}(t)$ and $S_{PDMy}(t)$ are obtained by performing product demodulations of V(t) with respect to $\cos(\omega_o t+\psi_x)$ and with respect to $\cos(\omega_o t+\psi_y)$ (or with respect to replicas of the periodic functions being used).

$$S_{PDMx}(t)=K_{PDM}R_x(t)$$

$$S_{PDMy}(t)=K_{PDM}R_y(t) \quad (10)$$

where $K_{PDM}$ is a constant.

For one form of time-division multiplexing, $\omega_{xr}$ and $\omega_{yr}$ have the same value $\omega_o$ with $\omega_o$ being greater than about 6ω and $\psi_{xr}$, and $\psi_{yr}$ are equal to an arbitrary number $\psi_o$. The voltages $V_{mxr}(t)$ and $V_{myr}(t)$ are proportional to square waves which take on values of 0 and 1, only one of which being equal to 1 at any given time and the duration of a "1" value being equal to an integer times 2π/ω. The voltages $V_{cn}(t)$ are both equal to a constant. The signals $S_{TDMx}(t)$ and $S_{TDMy}(t)$ are obtained by performing a product demodulation of V(t) with respect to $\cos(\omega_o t+\psi_o)$ (or replica) followed by parallel multiplications with $V_{mxr}(t)$ and $V_{myr}(t)$:

$$S_{TDMx}(t)=K_{TDM}V_{mxr}(t)R_x(t)$$

$$S_{TDMy}(t)=K_{TDM}V_{myr}(t)R_y(t) \quad (11)$$

where $K_{TDM}$ is a constant. It should be noted that $R_x(t)$ and $R_y(t)$ are available only when $V_{mxr}(t)$ and $V_{myr}(t)$ are non-zero.

The same results are obtained (except possibly for the value of the constant $K_{TDM}$) if $V_{mxr}(t)$, $V_{myr}(t)$ and $V_{cn}(t)$ are proportional to square waves which take on values of 0 and 1, only one of the square waves being equal to 1 at any given time, and the duration of a "1" value being equal to an integer times 2π/ω. This mode of operation may be desirable in that it completely isolates the forcing voltages $V_{cn}(t)U_n(t)$ from each other and from the excitation voltages $V_{mxr}(t)\cos(\omega_o t+\psi_o)$ and $V_{myr}(t)\cos(\omega_o t+\psi_o)$.

For another form of time-division multiplexing, $\omega_o$ equals 0 and $V_{mxr}(t)$, $V_{myr}(t)$, and $V_{cn}(t)$ are proportional to square waves which take on values of 0 and 1, only one of the square waves being equal to 1 at any given time, and the duration of a "1" value being equal to an integer times 2π/ω. Multiplying V(t) in parallel operations by $V_{mxr}(t)$ and by $V_{myr}(t)$ gives the same results as in the first form of time-division multiplexing.

For code-division multiplexing, $\omega_{xr}$, $\omega_{yr}$, $\psi_{xr}$, and $\psi_{yr}$ are all equal to 0, $V_{cn}(t)$ are constants, and $V_{mxr}(t)$ and $V_{myr}(t)$ are proportional to square waves which take on pseudo-random sequences of values of −1/T and 1/T and satisfy the following conditions:

$$\int_T V_i V_j \, dt = \begin{cases} 1; & i=j \\ 0; & i \neq j \end{cases} \quad (12)$$

where the subscripts i and j stand for any of the subscripts mxr, myr and cn. The integration time interval T should be less than 2π/3ω. The signals $S_{CDMx}(t)$ and $S_{CDMy}(t)$ are obtained by separately multiplying V(t) by $V_{mxr}(t)$ and $V_{myr}(t)$ and then integrating over T:

$$S_{CDMx}(nT)=K_{CDM}R_x(nT)$$

$$S_{CDMy}(nT)=K_{CDM}R_y(nT) \quad (13)$$

where $K_{TDM}$ is a constant and n is an integer. It should be noted that the signals $S_{CDMx}(t)$ and $S_{CDMy}(t)$ provide information concerning the standing-wave parameters at intervals of T.

The voltages $U_n(t)$ typically may include three components:

$$U_n(t)=U_{an}(t)+U_{qn}(t)+U_{rn}(t) \quad (14)$$

where the subscripts a, q, and r identify the amplitude, quadrature and rate control voltages. It is not necessary to isolate these components from one another in all applications. However, if isolation is desired, the following substitutions can be made in the foregoing equations.

$$V_{can}(t)U_{an}(t)+V_{cqn}(t)U_{qn}(t)+V_{crn}(t)U_{rn}(t) \text{ for } V_{cn}(t)U_n(t) \quad (15)$$

With these substitutions, any constraints imposed on $V_{cn}(t)$ also apply to $V_{can}(t)$, $V_{cqn}(t)$, and $V_{crn}(t)$. For example, equations (1) become $$V_n(t)=V_{mxr}(t)\cos(2\theta_r-2\theta_n)\cos(\omega_{xr}t+\psi_{xr})-V_{myr}$$

$$(t)\sin(2\theta_r-2\theta_n)\cos(\omega_{yr}t+\psi_{yr})+V_{can}(t)U_{an}(t)+V_{cqn}(t)U_{qn}(t)+V_{crn}(t)U_{rn}(t) \quad (16)$$

Figure 3:
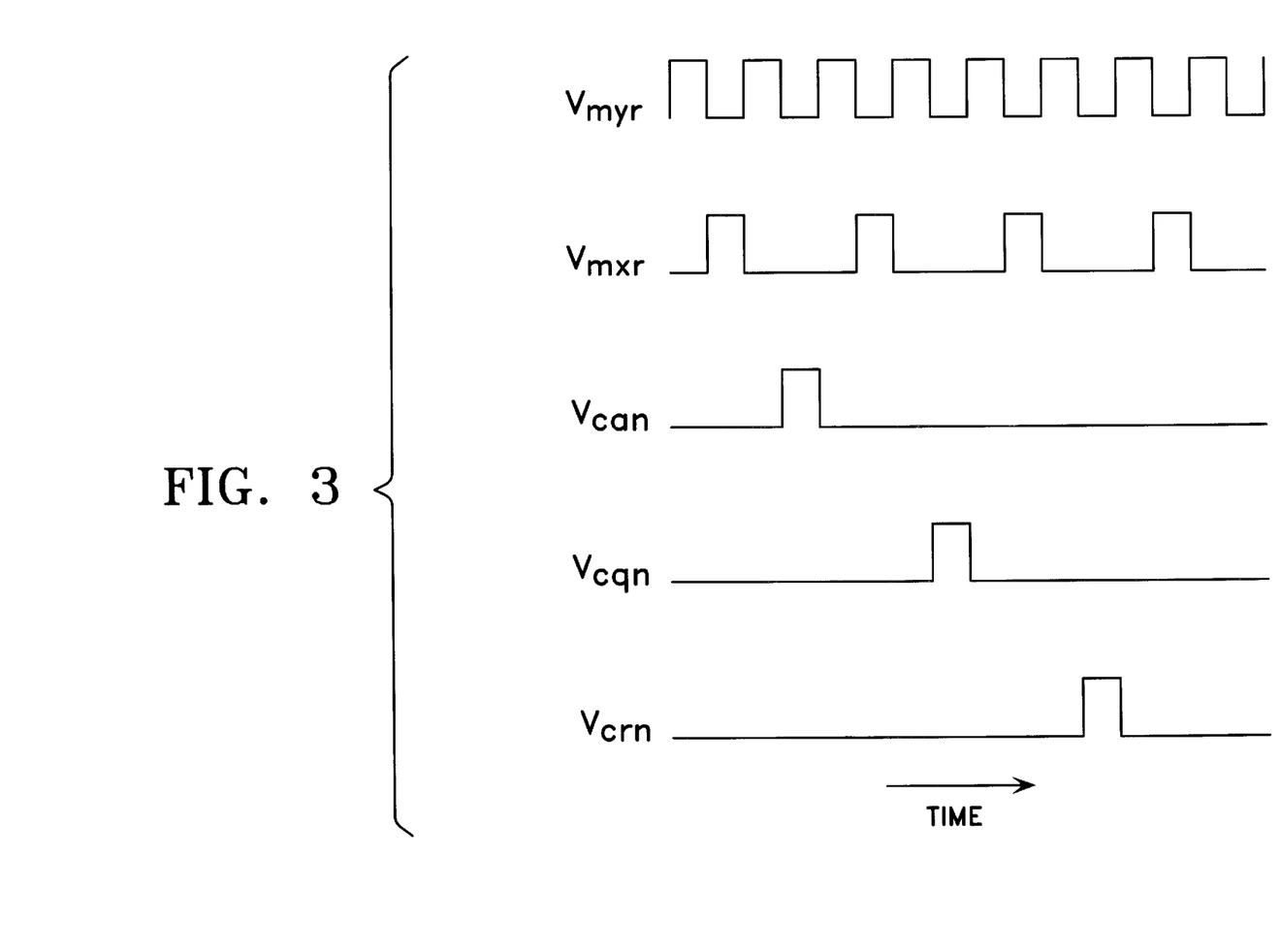
FIG. 3 shows the multiplex control signals for a particular embodiment of the invention.

One possible time-division-multiplex configuration is a sixteen-slot frame of duration 32π/ω synchronized to the flexure rate of the resonator. The multiplex control voltages are as shown in FIG. 3. When $\theta_r$ equals 0, the $x_r$ axes coincide with the antinodal axes and the $y_r$ axes coincide with the nodal axes. Eight slots are assigned to reading out the $y_r$ signal component, 4 slots to reading out the $x_r$ signal component, and 1 slot each to applying amplitude, quadrature, and rate forces to the resonator. For a vibration frequency of 4 kHz, readouts of the $x_r$ and $y_r$ signal components would be available at a rate of 2 kHz and 1 kHz respectively. The control voltages would be applied at a rate of 0.25 kHz.

In general, the signals $S_x(t)$ and $S_y(t)$ exiting from the amplifier-demultiplexer 44 have the form $$S_x(t)=K_{Vx}R_x(t)$$

$$S_y(t)=K_{Vy}R_y(t) \quad (17)$$

where $K_{Vx}$ and $K_{Vy}$ each equals $K_V$ except in the case of time-division multiplexing when $K_{Vx}$ equals $K_V V_{mx}(t)$ and $K_{Vy}$ equals $K_V V_{my}(t)$.

In order to extract the standing-wave parameters from the signals $S_x(t)$ and $S_y(t)$, a stable and precise replica of the resonator vibration signal $\cos(\omega t+\phi)$ is required. The replica is obtained from a voltage-controlled oscillator in replica generator 52 wherein the voltage-controlled oscillator is phase-locked to the in-phase standing-wave antinodal signal. The first step of the process is to multiply $S_x(t)$ and $S_y(t)$ first by the replica signal $\cos(\omega_r t+\phi_r)$ and lowpass filter the results and then by the phase-shifted replica $\sin(\omega_r t+\phi_r)$ and lowpass filter the results. The results of this process are:

$$S_{ix}(t) = K\{d_i \cos(2\theta - 2\theta_r)\cos[(\omega_r - \omega)t + (\phi_r - \phi)] + \quad (18)$$

$$d_q \sin(2\theta - 2\theta_r)\sin[(\omega_r - \omega)t + (\phi_r - \phi)]\}$$

$$S_{iy}(t) = K\{d_i \sin(2\theta - 2\theta_r)\cos[(\omega_r - \omega)t + (\phi_r - \phi)] -$$

$$d_q \cos(2\theta - 2\theta_r)\sin[(\omega_r - \omega)t + (\phi_r - \phi)]\}$$

-continued $$S_{qx}(t) = K\{d_i\cos(2\theta - 2\theta_r)\sin[(\omega_r - \omega)t + (\phi_r - \phi)] - d_q\sin(2\theta - 2\theta_r)\cos[(\omega_r - \omega)t + (\phi_r - \phi)]\}$$

$$S_{qy}(t) = K\{d_i\sin(2\theta - 2\theta_r)\sin[(\omega_r - \omega)t + (\phi_r - \phi)] + d_q\cos(2\theta - 2\theta_r)\cos[(\omega_r - \omega)t + (\phi_r - \phi)]\}$$

where K is a constant.

The next step is to form the following combinations of products of the $S_{ix}(t)$, $S_{iy}(t)$, $S_{qx}(t)$, and $S_{qy}(t)$:

$$E = S_{ix}^2 + S_{qx}^2 + S_{iy}^2 + S_{qy}^2 = K^2(d_i^2 + d_q^2)$$

$$Q = 2(S_{ix}S_{qy} - S_{iy}S_{qx}) = K^2(2d_id_q)$$

$$R = S_{ix}^2 + S_{qx}^2 - S_{iy}^2 - S_{qy}^2 = K^2(d_i^2 - d_q^2)\cos(4\theta - 4\theta_r)$$

$$S = 2(S_{ix}S_{iy} + S_{qx}S_{qy}) = K^2(d_i^2 - d_q^2)\sin(4\theta - 4\theta_r)$$

$$L_i = 2(S_{ix}S_{qx} + S_{iy}S_{qy}) = K^2(d_i^2 - d_q^2)\sin[2(\omega_r - \omega)t + 2(\phi_r - \phi)] \quad (19)$$

With $L_i(t)$ as the error signal, the phase-locked loop will lock up with the replica phase $\phi_r$ equal to $\phi$ and $\omega_r$ equal to $\omega$.

The difference between the standing-wave orientation angle and the tracking angle $\theta - \theta_r$, can be determined from the equation $$\tan(4\theta - 4\theta_r) = \frac{S(t)}{R(t)} \quad (20)$$

and the signs of $S_{ix}(t)$ and $S_{iy}(t)$. The quantity S(t) can be used as the error signal in a control loop which generates $\theta_r$ and causes on average $\theta$ to equal $\theta_r$ and $d/dt(\theta - \theta_r)$ to equal 0. The digitally-synthesized tracking angle $\theta_r$ is used in generating $\sin \theta_r$ and $\cos \theta_r$ which are supplied to the multiplexer 48. The actual value of $\theta$ at any given time is given by $$\theta = \theta_r + \frac{1}{4}\tan^{-1}\frac{S(t)}{R(t)} \approx \theta_r + \frac{1}{4}\frac{S(t)}{R(t)} \quad (21)$$

The quantities S(t) and R(t) can also be used to generate forces for application to the resonator which will cause the orientation angle to change until it is equal to a given tracking angle.

The difference between E(t) and a specified number is used as the error signal in the amplitude control loop which causes the total energy in the combined inphase and quadrature standing waves, which is proportional to $d_i^2 + d_q^2$, to equal the specified number.

The quantity Q(t) is used as the error signal in the quadrature control loop which results in the quadrature standing-wave amplitude $d_q$ to be zero. When this loop is closed, the amplitude control loop maintains the inphase amplitude $d_i$ at a specified value.

The use of the above control variables can be shown to be optimum. It will be apparent to those skilled in the art that there are many choices of control variables that are suboptimum but still practical.

The outputs of the control unit 50 are the functions $U_n(t)$ together with the sine and cosine of $\theta_r$, which are all supplied to multiplexer 48.

Additional details concerning vibratory rotation sensors are contained in U.S. Pat. No. 4,951,508 by Loper, Jr. et al. dated Aug. 28, 1990 which is incorporated by reference.

What is claimed is:

1. Apparatus for sensing rotation comprising:
   a housing;
   a resonator attached to the housing;
   a first set of electrodes consisting of one or more electrodes, the first set of electrodes being attached to either the resonator or the housing;
   a second set of N electrodes numbered from 1 to N attached around the circumference of either (1) the housing if the first set of electrodes is attached to the resonator or (2) the resonator if the first set of electrodes is attached to the housing, the n'th electrode being attached at angular position $\theta_n$ with respect to a reference point on the resonator, n taking on integer values between 1 and N, the second set of electrodes opposing the first set of electrodes, the second set of electrodes being spaced non-uniformly around the circumference for N equal to 4, 8, or 16.

2. The apparatus of claim 1 wherein the sum of $\exp(j4\theta_n)$ over n is equal to 0.

3. The apparatus of claim 1 wherein $\theta_n$ is equal to $2\pi n/N$ radians.

4. The apparatus of claim 1 wherein the resonator is a rotationally-symmetric thin-walled object capable of vibrating in at least one of a plurality of standing-wave modes, a standing-wave mode being a mode of vibration wherein a standing wave appears on the resonator, the orientation of a standing wave with respect to the reference point on the resonator being specified by an orientation angle, the one or more electrodes of the first set being electrically connected, the apparatus further comprising:
   driving electronics which supplies signals to one or more of the second set of electrodes; sensing electronics which receives a signal called the first-set signal appearing on the first set of electrodes and supplies one or more signals to the driving electronics.

5. The apparatus of claim 4 wherein the first-set signal includes a signal $V_x(t)R_x(t) + V_y(t)R_y(t)$, $V_x(t)$ and $V_y(t)$ being predetermined functions of time t and $R_x(t)$ and $R_y(t)$ being functions of (1) time, (2) the difference $\theta$ between the orientation angle of a standing wave and a tracking angle, and (3) the other parameters of the one or more standing waves, the sensing electronics separately performing operations $O_x$ and $O_y$ on the first-set signal to obtain scaled versions of $R_x(t)$ and $R_y(t)$ respectively.

6. The apparatus of claim 5 wherein $O_x$ includes multiplying the first-set signal by a replica of a periodic function of angular frequency $\omega_x$ and phase $\psi_x$ followed by lowpass filtering and $O_y$ includes multiplying the first-set signal by a replica of a periodic function of angular frequency $\omega_y$ and phase $\psi_y$ followed by lowpass filtering, the values of $\omega_x$, $\psi_x$, $\omega_y$, and $\psi_y$ being predetermined.

7. The apparatus of claim 5 wherein $O_x$ includes multiplying the first-set signal by a replica of a periodic function of angular frequency $\omega_o$ and phase $\psi_o$ followed by lowpass filtering and $O_y$ includes multiplying the first-set signal by a replica of the periodic function of angular frequency $\omega_o$ and phase $(\psi_o + \pi/2)$ followed by lowpass filtering, the values of $\omega_o$ and $\psi_o$ being predetermined.

8. The apparatus of claim 5 wherein $O_x$ includes multiplying the first-set signal by $V_{mxr}(t)$ and $O_y$ includes multiplying the first-set signal by $V_{myr}(t)$ where $V_{mxr}(t)$ and $V_{myr}(t)$ are proportional to predetermined square-wave functions of time which take on values of 0 and 1, the square-wave functions not being equal to 1 at the same time.

9. The apparatus of claim 5 wherein (1) $O_x$ includes (a) multiplying the first-set signal by a replica of a periodic function followed by lowpass filtering and (b) multiplying by $V_{mxr}(t)$ and (2) $O_y$ includes (a) multiplying the first-set signal by the replica of the periodic function followed by lowpass filtering and (b) multiplying by $V_{myr}(t)$, the replica of the periodic signal having an angular frequency of $\omega_o$ and phase $\psi_o$, the values of $\omega_o$ and $\psi_o$ being predetermined, $V_{mxr}(t)$ and $V_{myr}(t)$ being proportional to predetermined square-wave functions of time which take on values of 0 and 1, the square-wave functions not being equal to 1 at the same time.

10. The apparatus of claim 5 wherein $O_x$ includes multiplying the first-set signal by $V_{mxr}(t)$ followed by an integration over a predetermined time period T and $O_y$ includes multiplying the first-set signal by $V_{myr}(t)$ followed by an integration over time period T where $V_{mxr}(t)$ and $V_{myr}(t)$ are proportional to square wave functions of time which take on sequences of values −1 and 1 during time period T.

11. The apparatus of claim 5 wherein $R_x(t)$ and $R_y(t)$ are given by the equations $$R_x(t) = d_i \cos(2\Delta\theta)\cos(\omega t + \phi) - d_q \sin(2\Delta\theta)\sin(\omega t + \phi)$$

$$R_y(t) = d_i \sin(2\Delta\theta)\cos(\omega t + \phi) + d_q \cos(2\Delta\theta)\sin(\omega t + \phi)$$

where $d_i$ and $d_q$ are the flexing amplitudes respectively of the inphase and quadrature vibration modes, $\omega$ is the angular frequency of vibration of the resonator, and $\phi$ is the phase of vibration.

12. The apparatus of claim 4 wherein the driving electronics supplies a voltage $V_n(t)$ to the n'th electrode of the second set, $V_n(t)$ including voltage components $V_{mxr}(t)\cos(2\theta_r - 2\theta_n)F(\omega_{xr}t + \psi_{xr})$ and $V_{myr}(t)\sin(2\theta_r - 2\theta_n)F(\omega_{yr}t + \psi_{yr})$ where $V_{mxr}(t)$ and $V_{myr}(t)$ are either predetermined functions of time t or constants, $\theta_r$ is a tracking angle, and $F(\omega t + \psi)$ is a periodic function of time t with frequency $\omega$ and phase $\psi$, the values of $\omega_{xr}$, $\psi_{xr}$, $\omega_{yr}$, and $\psi_{yr}$ being predetermined.

13. The apparatus of claim 12 wherein $V_{mxr}(t)$ and $V_{myr}(t)$ are constants and $\omega_{xr}$, $\omega_{yr}$, and $|\omega_{xr} - \omega_{yr}|$ are greater than about $6\omega$, $\omega$ being the angular frequency of vibration of the resonator.

14. The apparatus of claim 12 wherein $V_{mxr}(t)$ and $V_{myr}(t)$ are constants, $\omega_{xr}$ and $\omega_{yr}$ are equal to a predetermined value $\omega_o$, and $\psi_{xr} - \psi_{yr}$ is equal to $\pi/2$ radians, $\omega$ being greater than about $6\omega$, $\omega$ being the angular frequency of vibration of the resonator.

15. The apparatus of claim 12 wherein $\omega_{xr}$, $\omega_{yr}$, $\psi_{xr}$, and $\psi_{yr}$ are equal to 0 and $V_{mxr}(t)$ and $V_{myr}(t)$ are proportional to first and second square-wave functions of time respectively which take on values of 0 and 1, the first and second square-wave functions not being equal to 1 at the same time.

16. The apparatus of claim 12 wherein $\omega_{xr}$ and $\omega_{yr}$ are equal to a predetermined value $\omega_o$, $\psi_{xr}$ and $\psi_{yr}$ are equal to a predetermined value $\psi_o$, and $V_{mxr}(t)$ and $V_{myr}(t)$ are proportional to first and second square-wave functions respectively which take on values of 0 and 1, $\omega_o$ being greater than about $6\omega$ where $\omega$ is the angular frequency of vibration of the resonator, the first and second square-wave functions not being equal to 1 at the same time.

17. The apparatus of claim 12 wherein $\omega_{xr}$, $\omega_{yr}$, $\psi_{xr}$, and $\psi_{yr}$ are equal to 0 and $V_{mxr}(t)$ and $V_{myr}(t)$ are proportional to first and second square-wave functions respectively which take on pseudorandom sequences of values of −1 and 1.

18. The apparatus of claim 12 wherein $V_n(t)$ also includes voltage components $V_{cn}(t)U_n(t)$, the quantities $V_{cn}(t)$ being either functions of time t or constants, the voltage components $V_{cn}(t)U_n(t)$ resulting in forces being applied to the resonator.

19. The apparatus of claim 18 wherein $V_{mxr}(t)$, $V_{myr}(t)$, and $V_{cn}(t)$ are constants and $\omega_{xr}$, $\omega_{yr}$, and $|\omega_{xr} - \omega_{yr}|$ are greater than about $6\omega$, $\omega$ being the angular frequency of vibration of the resonator.

20. The apparatus of claim 18 wherein $V_{mxr}(t)$, $V_{myr}(t)$, and $V_{cn}(t)$ are constants, $\omega_{xr}$ and $\omega_{yr}$ are equal to a predetermined number $\omega_o$, and $\psi_{xr} - \psi_{yr}$ is equal to $\pi/2$ radians, $\omega_o$ being greater than about $6\omega$, $\omega$ being the angular frequency of vibration of the resonator.

21. The apparatus of claim 18 wherein $\omega_{xr}$, $\omega_{yr}$, $\psi_{xr}$, and $\psi_{yr}$ are equal to 0 and $V_{mxr}(t)$, $V_{myr}(t)$, and $V_{cn}(t)$ are proportional to square-wave functions of time which take on values of 0 and 1, two or more of the square-wave functions not being equal to 1 at the same time.

22. The apparatus of claim 18 wherein $\omega_{xr}$ and $\omega_{yr}$ are equal to a predetermined value $\omega_o$, $\psi_{xr}$, and $\psi_{yr}$ are equal to a predetermined value $\psi_o$, and $V_{mxr}(t)$, $V_{myr}(t)$, and $V_{cn}(t)$ are proportional to square-wave functions of time which take on values of 0 and 1, $\omega_o$ being greater than about $6\omega$ where $\omega$ is the angular frequency of vibration of the resonator, two or more of the square-wave functions not being equal to 1 at the same time.

23. The apparatus of claim 12 wherein $V_n(t)$ also includes voltage components $V_{can}(t)U_{an}(t)$, $V_{cqn}(t)U_{qn}(t)$, and $V_{crn}(t)U_{rn}(t)$, the voltage components $V_{can}(t)U_{an}(t)$, $V_{cqn}(t)U_{qn}(t)$, and $V_{crn}(t)U_{rn}(t)$ resulting in forces being applied to the resonator, $\omega_x$, $\omega_y$, $\psi_x$, and $\psi_y$ being equal to 0, $V_{mxr}(t)$, $V_{myr}(t)$, $V_{can}(t)$, $V_{cqn}(t)$, and $V_{crn}(t)$ being proportional to square-wave functions of time which take on values of 0 and 1, two or more of the square-wave functions not being equal to 1 at the same time.

24. The apparatus of claim 12 wherein $V_n(t)$ also includes voltage components $V_{can}(t)U_{an}(t)$, $V_{cqn}(t)U_{qn}(t)$, and $V_{crn}(t)U_{rn}(t)$, the voltage components $V_{can}(t)U_{an}(t)$, $V_{cqn}(t)U_{qn}(t)$, and $V_{crn}(t)U_{rn}(t)$ resulting in forces being applied to the resonator, $\omega_x$ and $\omega_y$ being equal to a predetermined value $\psi_o$, $\psi_x$ and $\psi_y$ being equal to a predetermined value $\psi_o$, $\omega_o$ being greater than about $6\omega$ where $\omega$ is the angular frequency of vibration of the resonator, $V_{mxr}(t)$, $V_{myr}(t)$, $V_{can}(t)$, $V_{cqn}(t)$, and $V_{crn}(t)$ being proportional to square-wave functions of time which take on values of 0 and 1, two or more of the square-wave functions not being equal to 1 at the same time.

25. The apparatus of claim 18 wherein $\omega_{xr}$, $\omega_{yr}$, $\psi_{xr}$, and $\psi_{yr}$ are equal to 0 and $V_{mxr}(t)$ and $V_{myr}(t)$ are proportional to first and second square-wave functions of time respectively which take on pseudorandom sequences of values of −1 and 1, $V_{cn}(t)$ being constants.

26. The apparatus of claim 12 wherein $V_n(t)$ also includes voltage components $V_{can}(t)U_{an}(t)$, the voltage components $V_{can}(t)U_{an}(t)$ resulting in forces being applied to the resonator, the sensing electronics obtaining a measure of E, E being a measure of the sum of the squares of the flexing amplitudes of the inphase and quadrature vibration modes or an approximation thereof, the driving electronics utilizing E to generate $U_{an}(t)$ for one or more values of n which cause E to remain constant.

27. The apparatus of claim 12 wherein $V_n(t)$ also includes voltage components $V_{cqn}(t)U_{qn}(t)$, the voltage components $V_{cqn}(t)U_{qn}(t)$ resulting in forces being applied to the resonator, the sensing electronics obtaining a measure of Q, Q being a measure of the product of the flexing amplitudes of the inphase and quadrature vibration modes or an approximation thereof, the driving electronics utilizing Q to generate $U_{qn}(t)$ for one or more values of n which cause the quadrature standing-wave amplitude to be zero.

28. The apparatus of claim 12 wherein $V_n(t)$ also includes voltage components $V_{crn}(t)U_{rn}(t)$, the voltage components $V_{crn}(t)U_{rn}(t)$ resulting in forces being applied to the resonator, the sensing electronics obtaining a measure of R and S, R and S being proportional to the cosine and sine respectively of four times the difference in the orientation angle and the tracking angle or approximations thereof, the driving electronics utilizing R and S to generate $U_m(t)$ which causes the orientation angle to change until it equals the tracking angle.

29. The apparatus of claim 5 wherein the driving electronics generates the tracking angle, the driving electronics causing the tracking angle to equal a constant or a function of one or more of a plurality of variables, the plurality of variables including time, the orientation of the standing wave, and variables obtained from external sources.

30. The apparatus of claim 4 wherein the driving electronics generates a tracking angle, the driving electronics determining the orientation angle of the standing wave by adding the tracking angle to the difference between the orientation angle and the tracking angle.

31. A method for controlling and reading out an apparatus for sensing rotation comprising a resonator and a housing, a first set of one or more electrically-connected electrodes being attached to either the resonator or the housing, a second set of N electrodes numbered from 1 to N being attached to the resonator if the first set is attached to the housing and to the housing if the first set is attached to the resonator, n taking on integer values between 1 and N, the second set of electrodes being spaced non-uniformly around the circumference of the resonator or the housing for N equal to 4, 8, or 16, the second set of electrodes being in close proximity to the first set of electrodes, the resonator being capable of vibrating in one or more standing-wave modes, each standing wave mode being defined by a plurality of parameters, the orientation of a standing wave with respect to a reference point on the resonator being specified by an orientation angle, the method comprising the steps:

(a) specifying a tracking angle;

(b) generating a driving voltage for each of one or more of the second set of electrodes, the driving voltage for the n'th electrode being a function of the difference in the tracking angle and the angular position of the n'th electrode around the circumference of the resonator or housing;

(c) applying the generated driving voltages to the one or more of the second set of electrodes;

(d) determining the difference between the orientation angle of a standing wave and the tracking angle by performing operations on a signal called the first-set signal appearing on the first set of electrodes.

32. The method of claim 31 wherein each driving voltage includes a first excitation voltage and a second excitation voltage, the frequency spectrums of the first and second excitation voltages being confined to separated frequency bands.

33. The method of claim 31 wherein each driving voltage includes a first excitation voltage and a second excitation voltage, each excitation voltage being a periodic function of time with a predetermined frequency and a predetermined phase, the frequencies of the first and second excitation voltages being the same, the phases differing by a quarter of a cycle.

34. The method of claim 31 wherein each driving voltage includes a first excitation voltage and a second excitation voltage, each of the first and second excitation voltages being proportional to a unique square wave that takes on the values 0 and 1, only one of the square waves taking on the value 1 at any given time.

35. The method of claim 31 wherein each driving voltage includes a first excitation voltage and a second excitation voltage, each of the first and second excitation voltages being proportional to the product of a periodic function having a predetermined frequency and phase and a unique square wave that takes on the values 0 and 1, only one of the square waves taking on the value 1 at any given time.

36. The method of claim 31 wherein each driving voltage includes a first excitation voltage and a second excitation voltage, each of the first and second excitation voltages being proportional to a unique square wave which takes on the values of −1 and 1 in accordance with a predetermined pseudorandom sequence.

37. The method of claim 31 wherein each driving voltage includes a first excitation voltage and a second excitation voltage, the first excitation voltage being multiplied by the cosine of twice the difference in the tracking angle and the electrode angular position, the second excitation voltage being multiplied by the sine of twice the difference in the tracking angle and the electrode angular position.

38. The method of claim 31 wherein each of at least two driving voltages includes a first excitation voltage, a second excitation voltage, and a forcing voltage, the frequency spectrums of the first and second excitation voltages being confined to separated frequency bands, the frequency spectrum of the forcing voltages being confined to a frequency band separated from the frequency bands associated with the first and second excitation voltages.

39. The method of claim 31 wherein each driving voltage includes a first excitation voltage, a second excitation voltage, and a forcing voltage, each of the first and second excitation voltages being a periodic function with a predetermined frequency and a predetermined phase, the frequencies of the first and second excitation voltages being the same, the phases differing by a quarter of a cycle, the frequency spectrum of the forcing voltages being confined to a frequency band separated from the frequency of the first and second excitation voltages.

40. The method of claim 31 wherein each of at least two driving voltages includes a first excitation voltage, a second excitation voltage, and a forcing voltage, each of the first and second excitation voltages being proportional to a unique square wave that takes on the values 0 and 1, each forcing voltage including a multiplicative factor proportional to a square wave that takes on the values 0 and 1, only one of the square waves associated with the excitation and forcing voltages taking on the value 1 at any given time.

41. The method of claim 31 wherein each of at least two driving voltages includes a first excitation voltage, a second excitation voltage, and a forcing voltage, each of the first and second excitation voltages being proportional to the product of a periodic function with a predetermined frequency and a predetermined phase and a unique square wave that takes on the values 0 and 1, each forcing voltage including a multiplicative factor proportional to a square wave that takes on the values 0 and 1, only one of the square waves associated with the excitation and forcing voltages taking on the value 1 at any given time.

42. The method of claim 31 wherein each of at least two driving voltages includes a first excitation voltage, a second excitation voltage, and a forcing voltage, each of the first and second excitation voltages being proportional to a unique square wave which takes on the values of −1 and 1 in accordance with a predetermined pseudorandom sequence, the frequency spectrum of the forcing voltages being confined to a frequency band separated from the frequency band associated with the excitation voltages.

43. The method of claim 31 wherein the first-set signal is the sum of two components that are functions of the parameters of the standing waves and the tracking angle, step (d) comprising the steps:

(d1) extracting each of the two components from the first-set signal;

(d2) determining the difference between the orientation angle of one of the standing-waves and the tracking angle by performing operations on the two components.

44. The method of claim 43 wherein the two components occupy separated frequency bands, each component being extracted by performing operations on the first-set signal that discriminate between the separated frequency bands.

45. The method of claim 43 wherein the two components are periodic functions of time having the same frequency and phases that differ by one-quarter of a cycle, each component being extracted by performing operations on the first-set signal that discriminate between the phases of the two components.

46. The method of claim 43 wherein the two components are present in the first-set signal during different time periods, each component being extracted by performing operations on the signal appearing on the first set of electrodes that discriminate between the different time periods.

47. The method of claim 43 wherein the two components are pseudorandom sequences of 0's and 1's, the cross correlation of the two pseudorandom sequences being equal to 0, each component being extracted by performing operations on the first-set signal that discriminate between the two pseudorandom sequences.

48. The method of claim 43 wherein each of the two components is a sum of two terms, one term containing the sine of twice the difference between the orientation angle and the tracking angle, the other term containing the cosine of twice the difference between the orientation angle and the tracking angle.

49. The method of claim 43 further comprising the step:

(e) causing the tracking angle to equal a constant or a function of one or more of a plurality of variables, the plurality of variables including time, the orientation of the standing wave, and variables obtained from external sources.

50. The method of claim 49 further comprising the step:

(f) calculating orientation angle by adding the tracking angle to the measured difference between the orientation angle and the tracking angle.

51. The method of claim 31 wherein the driving voltage for each of the one or more of the second set of electrodes includes a component which causes the sum of the squares of the inphase and quadrature resonator flexing amplitudes to remain constant.

52. The method of claim 31 wherein the driving voltage for each of the one or more of the second set of electrodes includes a component which causes a quadrature resonator flexing amplitude to be equal to zero.

53. The method of claim 31 wherein the driving voltage for each of the one or more of the second set of electrodes includes a component which causes the orientation angle to become and remain equal to the tracking angle.

54. The method of claim 31 further comprising the step:

(e) causing the tracking angle to become and remain equal to the orientation angle.

55. Apparatus for practicing the method of claim 31.

56. Apparatus for practicing the method of claim 43.

* * * * *